United States Patent [19]

Morrison

[11] 4,343,853

[45] Aug. 10, 1982

[54] ANTIMICROBIALLY TREATED FABRIC CONSTRUCTION

[76] Inventor: Willard L. Morrison, 1896 Meadowbrook Dr., Winston-Salem, N.C. 27104

[21] Appl. No.: 127,558

[22] Filed: Mar. 6, 1980

[51] Int. Cl.³ .............................................. B32B 5/26
[52] U.S. Cl. ................................... 428/233; 428/280; 428/292; 428/293; 428/905; 428/907
[58] Field of Search ................. 428/95, 233, 234, 235, 428/280, 292, 293, 300, 365, 905, 907

[56] References Cited

U.S. PATENT DOCUMENTS

| | | | |
|---|---|---|---|
| 2,919,200 | 12/1959 | Dubin et al. | 424/78 |
| 3,134,714 | 5/1964 | Pence | 428/907 |
| 3,296,000 | 1/1967 | Bockno | 424/322 |
| 3,345,341 | 10/1967 | Berry et al. | 428/907 |
| 3,922,723 | 12/1975 | Popper | 2/53 |
| 3,959,556 | 5/1976 | Morrison | 428/36.5 |
| 4,146,663 | 3/1979 | Ikeda et al. | 428/233 |

*Primary Examiner*—William J. Van Balen
*Attorney, Agent, or Firm*—Charles R. Rhodes; Judith G. Smith

[57] ABSTRACT

A unique fabric construction having a backing fabric and a face fabric. At least one of the fabrics is made at least in part of yarns formed from synthetic fibers which have incorporated thereinto an antimicrobial agent. In some embodiments a tie yarn joins the two faces in plated relation. Even with minimal contact of the yarns in the two fabrics, the antimicrobial agent migrates from within the treated fibers in the one fabric to the surface thereof and transfers to the yarns in the other fabric. Thus there is imparted antimicrobial protection to both fabric faces while maintaining the advantages of naturally occurring, untreated fibers in one of the fabrics.

6 Claims, 2 Drawing Figures

ANTIMICROBIALLY TREATED FABRIC CONSTRUCTION

BACKGROUND AND SUMMARY OF THE INVENTION

This invention relates to the production of improved antimicrobial fabrics and articles made therefrom, which fabrics and articles do not lose the desirable attributes of comfort, soft hand, absorbency, better appearance which have heretofore been available only by utilization of naturally occurring articles. "Antimicrobial" is used herein to include both fungicidal and antibacterial agents, the latter functioning as either bacteriostatic or bactericidal agents. Much research has been conducted in this field with considerable development in the areas of clothing and intimate apparel. Efforts have been somewhat concentrated in the areas of deodorizing or inhibiting bacterial, fungal, or microbial growth in synthetic textile articles such as surgical gowns and masks, institutional textile products, and clothing items such as shirts, T-shirts, and athletic uniforms, etc. Inhibiting fungal growth serves to protect the fabric itself, while the inhibition of bacterial growth prevents odor, since odor is caused by the bacterial breakdown of organic matter. Therefore, both characteristics are desirable.

Many approaches have proved impractical or have demonstrated limited success. Two approaches are described in U.S. Pat. No. 3,922,723 and No. 3,296,000. Utilization of these teachings has demonstrated that the antimicrobial topical treatments to the yarns and/or fabrics is relatively shortlived. This fact is particularly true for articles of clothing the surfaces of which are subjected to mechanical abrasion during repeated cleaning and launderings. Each cleaning process removes a certain amount of the antimicrobial agent until the agent is dissipated and of no effectiveness.

Another approach to antimicrobial yarns and fabrics is disclosed in applicant's previous patent, U.S. Pat. No. 3,959,556, directed to a composite yarn construction showing a desirable level of antimicrobial activity. The yarn disclosed therein includes naturally occurring fibers intimately combined with a selected group of antimicrobially treated synthetic fibers. The results are characterized by the migration of the antimicrobial agent from within the intermolecular structure of the synthetic fibers onto the surface of and throughout the naturally occurring fibers, to impart antibacterial properties not only to the synthetic fibers but also to the naturally occurring fibers. A preferred embodiment of this yarn is a construction from synthetic polymeric fibers having an antimicrobial agent incorporated therein in an amount equalling at least 0.1% by weight of the polymeric resin, the antimicrobial agent selected from the group consisting of 2,4,4'-trichloro-2'-hydroxydiphenyl ether; 2,2'-methylenebis-(3,4,4'-trichlorophenol); and 2,2'-thiolis, 4,6-dichlorophenol. The chemical data describing the antimicrobial treatment of the synthetic fibers is fully described in applicant's aforementioned U.S. Pat. No. 3,959,556, the disclosure of which is hereby incorporated by reference in the present application.

The aforementioned earlier patent 3,959,556 requires intimate admixing of antimicrobially treated fibers and naturally occurring fibers in order to transfer the effect to the natural fibers. The present application is directed to achieving the same effect without such intimate admixing of fibers. This effect is achieved by constructing a "two-face" fabric, one of the faces formed at least in part by synthetic yarn which has been "treated" with an antimicrobial agent as described in the patent 3,959,556, the other of the faces comprising untreated yarn. As used herein "treated" with an antimicrobial agent includes the incorporation of the agent into the intermolecular structure of the resin so that it migrates to the surface thereof maintaining a relatively permanent treatment thereof. The "two-face" fabric may be a plated fabric with or without a tie yarn, it may be a carpet construction with a woven backing having other yarn tufted thereto, or other similar constructions in which yarns of one type are joined together to form a layer in one plane while yarns of another type are joined together to form a second layer in generally a second plane.

In one embodiment, the fabric formed according to the present invention is used to construct athletic sweatshirts having a face fabric and a backing fabric. The face fabric is formed of a 50% acrylic-50% cotton, antimicrobially untreated yarn; and the backing fabric is formed of a 100% acrylic, antimicrobially treated yarn. The interconnecting or tie yarn may be either fiber, preferably the same as in the face.

Experimentation with such a fabric structure has demonstrated the unexpected ability of the active antimicrobial agent to migrate all the way from a backing fabric to a face fabric. Although the two faces are not in intimate contact with each other due to the tie yarn in between, such a plated fabric structure has been found effective in not only the treated backing fabric, but also in the untreated face fabric.

Demonstration of the above unexpected capabilities of a treated fabric to protect an adjacent untreated fabric enables the production of articles of apparel and other manufacture with advantages theretofore unattainable. For example, in the aforementioned sweatshirt construction, it is not essential that the face fabric which normally forms the outside of the sweatshirt contain any antimicrobially treated, synthetic yarn. Rather a fabric formed of untreated, perhaps natural, fiber having a more pleasing appearance and feel (hand) and wearability can be used on the outside. The antimicrobially treated, synthetic yarn then can be used in the backing fabric alone. The antimicrobial agent will migrate from the backing fabric to the untreated facing fabric. Alternatively the synthetic, treated fabric might be in the face, while the backing fabric could utilize more comfortable natural yarns next to the skin. Other articles might use either alternative depending on the desired results.

Where in the past it has always been necessary that the antimicrobial fibers be intimately admixed with the non-antimicrobial fibers, as by blending, plying and the like, and the fabric formed therefrom necessarily in contact with the body of the wearer, it is now possible to alter that arrangement almost as desired. It is now possible that the treated and untreated fibers or fabrics can be only adjacent, not necessarily interlaced or intertwined, and they may even be tied together by an untreated yarn or fabric. This is also quite advantageous from an appearance standpoint. The visible face fabric need not have any synthetic yarns therein, but can have antimicrobial properties resulting from an invisible, treated backing fabric.

The ability of the one face having one antimicrobial properties to protect against microbial growth on the other is far more than other known approaches of treated yarns and/or fabrics have offered. Growth of mildew and odor forming bacteria has been significantly decreased as will be discussed in the example below.

A primary object of the present invention is the provision of a fabric construction wherein an antimicrobially treated fabric is formed in a "two-face" or layered relation with a non-antimicrobial, or untreated fabric, with the effect being that the untreated fabric receives the benefits of the antimicrobial agent in the treated fabric even where the two fabrics are not intimately joined. This objective has been realized with the antimicrobial properties of the combination exceeding expectations.

Other objects and a fuller understanding of the invention will become apparent upon reading the following detailed description of a preferred embodiment along with the accompanying drawings in which:

BRIEF DESCRIPTION OF THE PHOTOGRAPHS

DETAILED DESCRIPTION OF A PREFERRED EMBODIMENT

Figure 1:
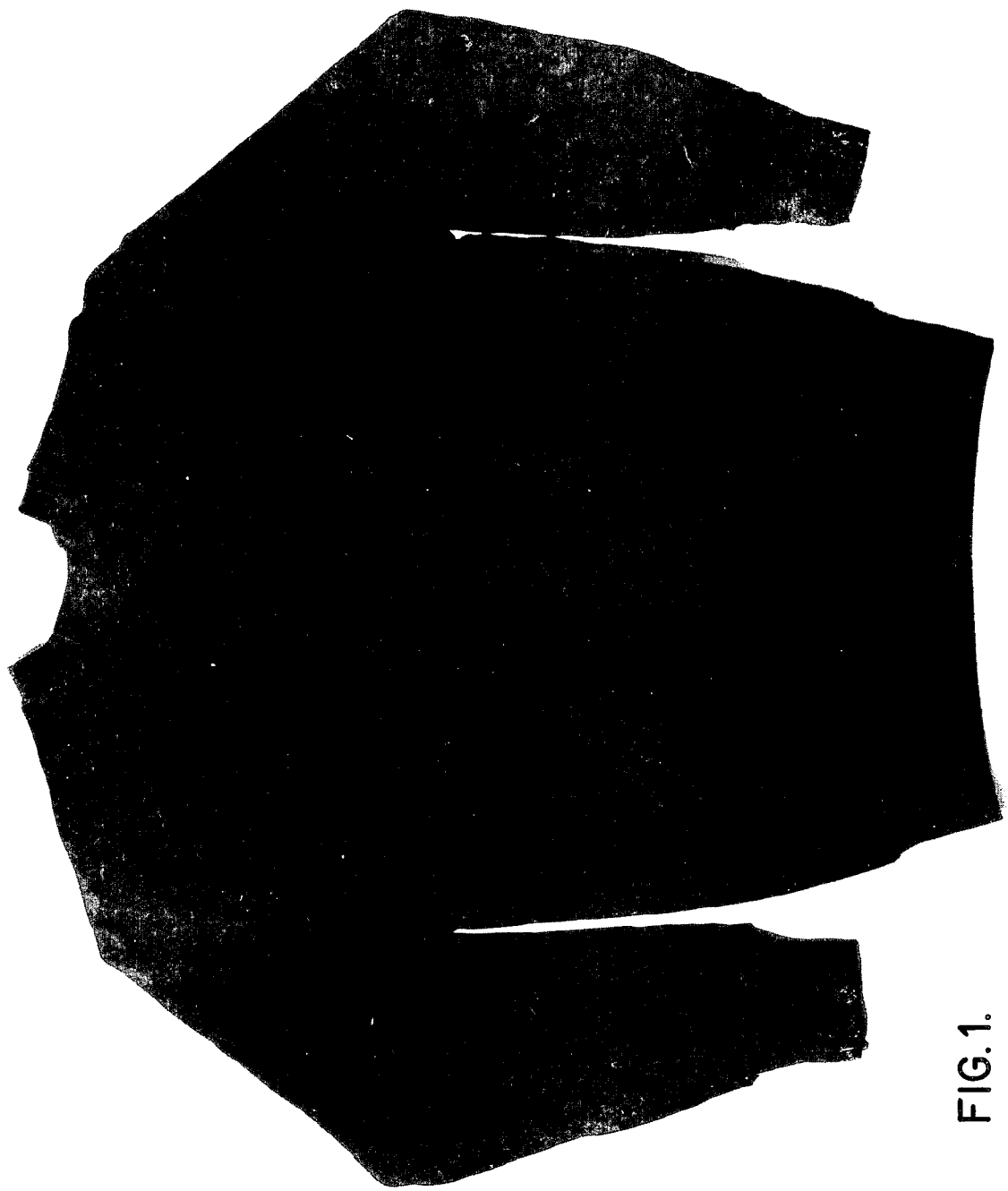
FIG. 1 is a photograph of a sweatshirt illustrating a comparison of fabric formed by the technique of the present invention as compared with fabric formed according to conventional techniques.

As hereinbefore stated the present invention is directed to a double face fabric in which one face is formed at least partially by yarns containing antimicrobially treated synthetic fibers. In a preferred embodiment the antimicrobial agent employed is 2,4,4'trichloro-2'-hydroxydiphenyl ether. Alternatively, other agents such as disclosed in U.S. Pat. No. 2,919,200 to Dubin et al, and which include 2,2'-thiobis(4,6-dichlorophenol and 2,2'-methylenebis-(3,4,6-trichloro) phenol, may be employed. Still further known antibacterial or fungicidal agents possessing the properties of those above include nitrophenylacetate; phenylhydrazine; polybrominated salicylanilides, such as 5,4'-dibromosalicylanilide and 3,5,4'-tribromosalicylanilide; chlorhexidine; domiphen bromide; cetylpyridinium chloride; and benzethonium chloride. The important characteristics of the agent, besides its ability to kill and/or inhibit growth of bacteria and fungus, is its ability to be stored within the intermolecular structure of the polymer into which it is incorporated in a molten state, then migrate to the surface of the polymeric fiber when the surface equilibrium is disturbed as by laundering, or by the accumulation of moisture thereon in other fashions (perspiration for example). In this manner continual antimicrobial properties are imparted until the original reservoir of antimicrobial agent originally placed in solution within the molten resin has been exhausted.

Types of fiber forming thermoplastic resins which are known to receive and be compatible with such agents include polyamides such as nylon 6, and nylon 66; acrylics; modacrylics; saran (80% vinylidene chloride); vinyon (comonomer containing 85% vinyl chloride); vinyl; polyvinylchloride; a vinyon/vinal (textile fiber made from polyvinyl alcohol) copolymer such as Cordelan (registered trademark of Kohjin Co., Tokyo, Japan); the polyolefins, particularly polypropylene and polyethylene, and nylon 4 (sold under trademark Tajmir by Chevron Corp., Odenton, Md.). In one method of forming yarn the resin is admixed in either the dry or molten state or in a spinnable solution with a small amount (0.1-1.5% by weight) of the selected antimicrobial agent. The mixture is then heated (in the case of those admixed in the molten state) to a temperature above the melting point of both the resin and the agent, but below the decomposition point of the agent. The mixture is then extruded or otherwise formed into filaments desirably having a denier of at least 1.5. The filaments are then preferably chopped into short fiber lengths (about one inch to about three inches), then formed into yarn either alone or by blending with other types of fibers. This concept can also, of course, be applied to monofilament or multifilament yarn.

More specifically in one example, 1.0% by weight of the agent 2,4,4'trichloro-2'-hydroxydiphenyl ether is incorporated into acrylic resin and formed into yarn according to the above procedure. The short yarn fibers are of 1.7 denier and 40 mm. in length and are formed into a resulting treated, 26 singles yarn.

An example of test clothing constructed during an experimentation program includes the sweatshirt illustrated in FIG. 1 constructed as follows. The sweatshirt was constructed with a vertical seam in the body dividing the shirt in half. One half (left hand side) of the body plus the sleeve was formed of a conventional plated construction consisting of a face fabric, a tie yarn, and a backing fabric or face composed of a blended, non-antimicrobial or "untreated" spun yarn of 28/1 50/50 cotton/acrylic. The entire neckband, waistband, and both cuffs were composed of the same blended, untreated yarns.

The other half (right hand side) of the shirt was formed of a fabric constructed in accordance with the present invention. Such fabric included the 50% acrylic-50% cotton, non-antimicrobial yarn in the face; a similar tie yarn; and the aforedescribed antimicrobial, treated 100% acrylic backing fabric. The backing fabric prior to fabrication on both sides of the sweatshirt was brushed to provide a fleeced effect, an optional treatment for appearance and comfort only.

Figure 2:
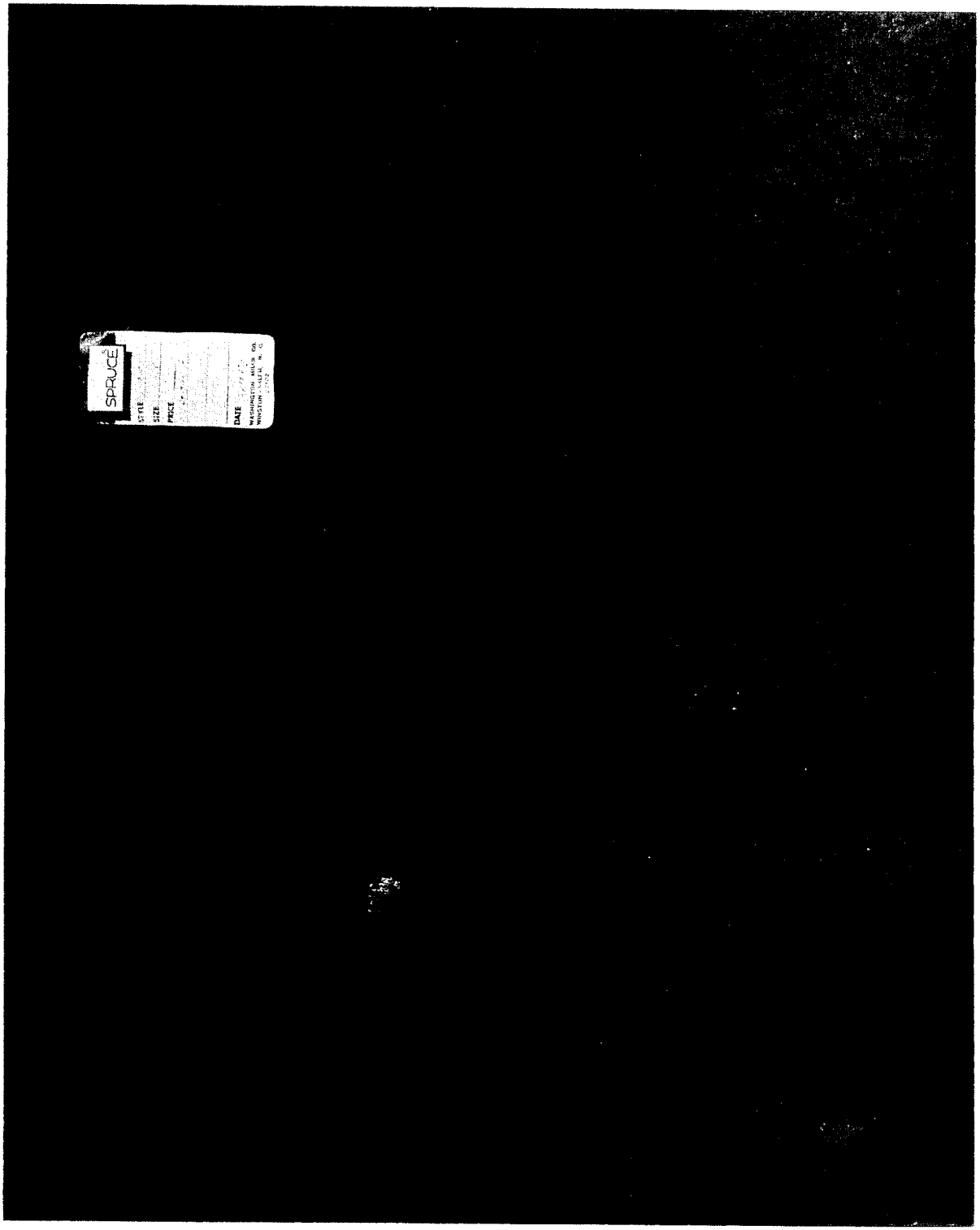
FIG. 2 is a photograph of a portion of the sweatshirt illustrating in enlarged fashion a small area thereof designated by the circle in FIG. 1.

Following construction, the above sweatshirt was worn daily for a two-week period by a college-age male during an exercise program. The test shirt was then closed in a plastic bag and left in the trunk of a car for a three-week period during the high temperature months of July and August. At the end of that period the test shirt was removed from the bag and placed on a hanger overnight, then photographed as illustrated in FIGS. 1 and 2.

Examination of the sweatshirt indicated considerably less fungal growth due to migration of the antimicrobial component from the backing to the face fabric. The antimicrobially treated body and sleeve side of the shirt revealed very minimal bacterial growth. Even the cuff on the treated side exhibited some inhibition. Additional laboratory experiments have shown that the same fabric treated with the antimicrobial agent, using the standard Bauer-Kirby experiments, also show a zone of inhibition against both gram positive and gram negative.

It will be apparent to those skilled in the art that further modifications may be made to the above disclosed invention, without departing from the scope of the claims below.

What is claimed is:

1. A fabric construction including a face fabric and a backing fabric and wherein:
   (a) said backing fabric being formed from a first synthetic yarn comprising fiber-forming polymers having an antimicrobial agent incorporated therein in an amount equalling at least 0.1% by weight of the polymer, said antimicrobial agent being characterized by its ability to be stored in the intermolecular structure of the polymer and to migrate to the surface;
   (b) said face fabric being formed from a second yarn including untreated fibers only;
   (c) said face fabric and said backing fabric being in plated relationship;
   whereby said antimicrobial agent transfers to said second face to inhibit antimicrobial growth thereon.

2. The fabric construction defined in claim 1 and further including a tie yarn formed from at least one of said first and second yarns and lying intermediate said first and second faces of said plated fabric.

3. The fabric construction according to claim 1 wherein said antimicrobial agent is selected from the group consisting of 2,4,4'-trichloro-2'-hydroxydiphenyl ether; 2,2'-methylenebis-(3,4,4'-trichlorophenol); 2,2'-thiobis, 4,6-dichlorophenol, said agent being added to said polymeric fibers in the amount of 0.1% by weight of said polymeric fibers.

4. The fabric construction according to claim 3 wherein said second yarn is formed from naturally occurring fibers.

5. A method of imparting an antibacterial characteristic to untreated yarns in a two-face fabric comprising the steps of:
   (a) forming a first fabric face yarns in a first plane including fibers having no prior antibacterial treatment;
   (b) forming a second fabric face generally in a second plane relative to said first plane from yarns at least partially formed of fiber forming polymers having an antimicrobial agent incorporated therein in an amount equalling at least 0.1% by weight of the polymer, said antimicrobial agent characterized by its ability to be incorporated into the intermolecular structure of the polymer and to migrate to the surface in the presence of moisture.

6. The method according to claim 5 wherein said first and second faces are plated together and a tie yarn formed of untreated fibers is manipulated back and forth between the face and backing fabrics.

* * * * *